(12) United States Patent
Jacobsen et al.

(10) Patent No.: US 9,215,235 B1
(45) Date of Patent: Dec. 15, 2015

(54) USING EVENTS TO IDENTIFY A USER AND ENFORCE POLICIES

(75) Inventors: Michael Jacobsen, Mountain View, CA (US); Song Wang, Palo Alto, CA (US); Wilson Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/113,939

(22) Filed: May 23, 2011

(51) Int. Cl.
*H04L 29/06* (2006.01)
*G06F 21/30* (2013.01)

(52) U.S. Cl.
CPC ............... *H04L 63/10* (2013.01); *G06F 21/30* (2013.01)

(58) Field of Classification Search
CPC .............................. H04L 63/10; G06F 21/30
USPC .......................................................... 726/1
See application file for complete search history.

(56) References Cited

U.S. PATENT DOCUMENTS

| | | | |
|---|---|---|---|
| 6,088,801 A | 7/2000 | Grecsek | |
| 6,751,634 B1 | 6/2004 | Judd | |
| 6,941,465 B1 | 9/2005 | Palekar et al. | |
| 6,944,668 B1 | 9/2005 | Broquist et al. | |
| 7,240,015 B1 | 7/2007 | Karmouch et al. | |
| 7,263,353 B2 | 8/2007 | Forsberg et al. | |
| 7,269,853 B1 | 9/2007 | Dunn | |
| 7,281,137 B1 | 10/2007 | Vitikainen | |
| 7,324,999 B2 | 1/2008 | Judd | |
| 7,360,237 B2 | 4/2008 | Engle et al. | |
| 7,395,341 B2 | 7/2008 | Nicodemus et al. | |
| 7,428,746 B2 | 9/2008 | Engle et al. | |
| 7,428,753 B2 | 9/2008 | Engle et al. | |
| 7,475,419 B1 | 1/2009 | Basu et al. | |
| 7,555,550 B2 * | 6/2009 | Schunemann | 709/224 |
| 7,669,226 B2 | 2/2010 | Bhide et al. | |
| 7,818,440 B1 * | 10/2010 | Givoly | 709/230 |
| 7,856,652 B2 | 12/2010 | Hieda | |
| 7,962,513 B1 | 6/2011 | Boles et al. | |
| 8,000,299 B2 | 8/2011 | Lee | |
| 8,260,907 B2 | 9/2012 | O'Sullivan | |
| 8,296,820 B2 | 10/2012 | Kao et al. | |
| 8,312,507 B2 | 11/2012 | Chen et al. | |
| 8,423,631 B1 | 4/2013 | Mower et al. | |
| 8,516,539 B2 | 8/2013 | Kumar et al. | |
| 8,677,447 B1 | 3/2014 | Zuk et al. | |
| 2001/0019559 A1 | 9/2001 | Handler et al. | |
| 2003/0126613 A1 * | 7/2003 | McGuire | 725/109 |
| 2003/0177389 A1 | 9/2003 | Albert et al. | |
| 2005/0132060 A1 * | 6/2005 | Mo et al. | 709/227 |
| 2006/0075092 A1 * | 4/2006 | Kidokoro | 709/224 |
| 2006/0095570 A1 | 5/2006 | O'Sullivan | |
| 2006/0212583 A1 * | 9/2006 | Beadle et al. | 709/227 |
| 2006/0277185 A1 | 12/2006 | Sato et al. | |
| 2006/0288003 A1 | 12/2006 | Desai et al. | |
| 2007/0004393 A1 | 1/2007 | Forsberg et al. | |
| 2007/0073519 A1 * | 3/2007 | Long | 702/185 |
| 2007/0226775 A1 | 9/2007 | Andreasen et al. | |
| 2008/0060064 A1 | 3/2008 | Wynn et al. | |
| 2008/0109870 A1 * | 5/2008 | Sherlock et al. | 726/1 |

(Continued)

*Primary Examiner* — Christopher Revak
*Assistant Examiner* — Jason C Chiang
(74) *Attorney, Agent, or Firm* — Van Pelt, Yi & James LLP (57) ABSTRACT

Enforcing a policy is described. A mapping between an IP address of a device and a user identity is identified, at least in part by correlating event information. A policy is applied to the device based at least in part on the user identity. One example of an event is an access to a mail server, such as an access to a Microsoft Exchange server.

20 Claims, 7 Drawing Sheets

(56) References Cited

U.S. PATENT DOCUMENTS

| | | |
|---|---|---|
| 2009/0012760 A1* | 1/2009 | Schunemann ................ 703/6 |
| 2009/0192970 A1* | 7/2009 | O'Sullivan et al. ........... 706/48 |
| 2009/0193498 A1 | 7/2009 | Agarwal et al. |
| 2009/0249440 A1 | 10/2009 | Platt et al. |
| 2009/0327503 A1 | 12/2009 | Hochmuth et al. |
| 2010/0071042 A1 | 3/2010 | Hochmuth et al. |
| 2010/0235880 A1* | 9/2010 | Chen et al. ................ 726/1 |
| 2010/0287599 A1 | 11/2010 | He et al. |
| 2010/0325717 A1 | 12/2010 | Goel et al. |
| 2011/0264531 A1* | 10/2011 | Bhatia et al. ............ 705/14.66 |
| 2012/0017085 A1 | 1/2012 | Carter et al. |
| 2012/0078903 A1 | 3/2012 | Bergstein et al. |
| 2012/0271953 A1 | 10/2012 | Gulley et al. |
| 2013/0124563 A1 | 5/2013 | Cavelie et al. |

\* cited by examiner

USING EVENTS TO IDENTIFY A USER AND ENFORCE POLICIES

BACKGROUND OF THE INVENTION

Devices such as firewalls are sometimes used to prevent users, such as employees of a company, from accessing resources to which they are not authorized. As an example, access to a specific website or to a class of websites may be prohibited for all users. Access can also be granted in a more granular level, such as by permitting some users or groups of users to access a resource, while prohibiting access for other users/groups. Unfortunately, enforcing granular polices can be difficult, particularly as the number and variety of types of devices present in an enterprise network continue to increase.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
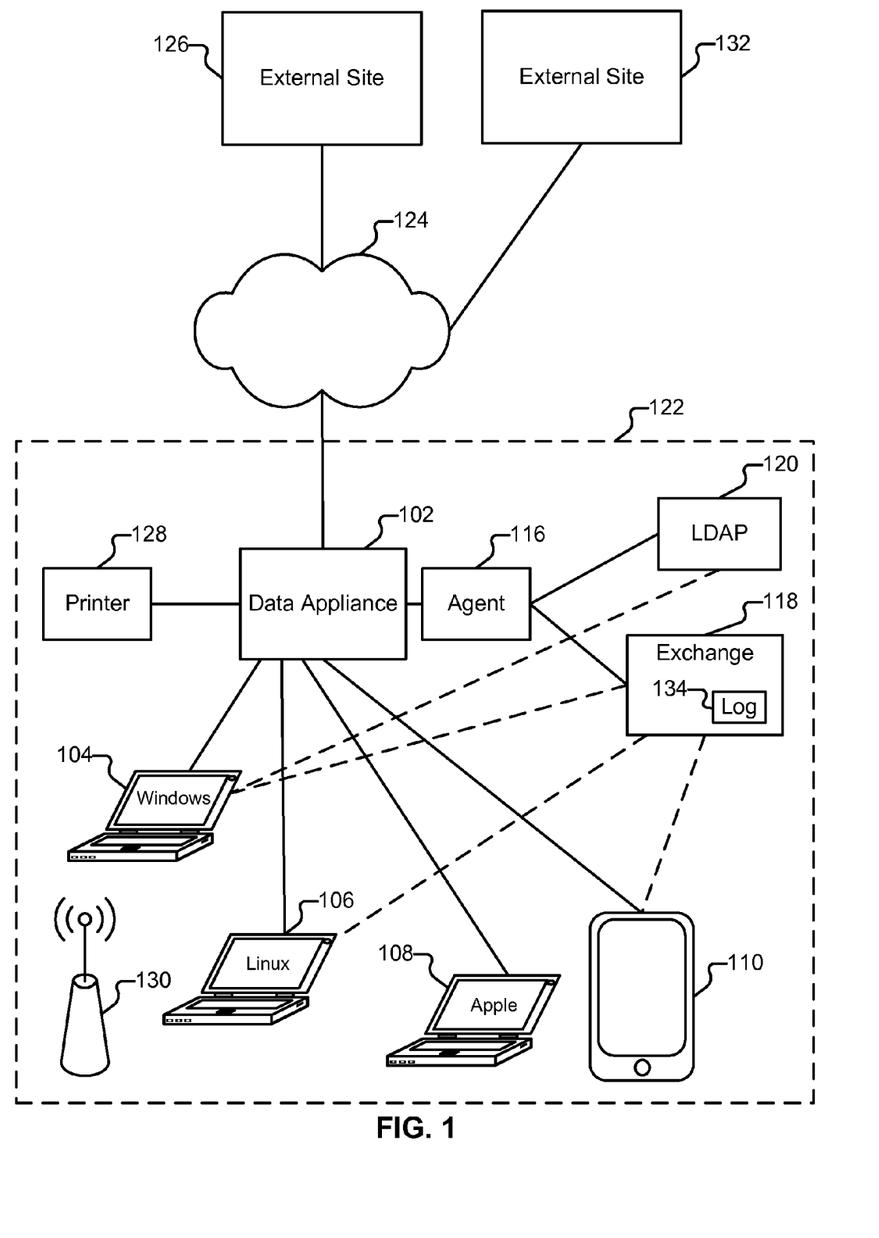
FIG. 1 illustrates an embodiment of an environment in which user identities are determined based on events (such as Microsoft Exchange events) and in which policies that incorporate the identities can be enforced.

FIG. 1 illustrates an embodiment of an environment in which user identities are determined based on events (such as Microsoft Exchange events) and in which policies that incorporate the identities are enforced. As illustrated in FIG. 1, a variety of client devices 104-110 are present in an enterprise network 122 which belongs to the ACME Corporation. Device 104 is a computer running a Windows-based operating system and is assigned to Alice. Device 106 is a computer running an Ubuntu Linux operating system and is assigned to Bob. Device 108 is a computer running the Mac OS X operating system and is also assigned to Bob. Device 110 is a tablet computer running an Android-based operating system and is personally owned by Alice, who sometimes brings the device into work with her. Device 110 is not provided to Alice by ACME Corporation. Other types of devices may also be used in conjunction with the techniques described herein, such as cellular phones/personal digital assistants, tablet computers, game consoles, and set-top boxes.

Communications between client devices 104-110 and resources outside of network 122 (e.g., external site 126 reachable via external network 124) pass through data appliance 102. Such communications may take place using any appropriate communication protocol, such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. For example, a router, gateway, intrusion detection system, intrusion prevention system, or other appropriate device can be configured to perform either or both of the user identity detection functionality and policy enforcement functionality. In some embodiments, policy enforcement appliance 102 is also configured to enforce policies with respect to traffic that stays within enterprise network 122.

Also included in network 122 is a directory service provider 120 (also referred to as a domain controller), which makes use of the Lightweight Directory Access Protocol (LDAP) or other appropriate protocols. One example of a directory service provider 120 is a Microsoft Active Directory server. Other types of systems can also be used instead of directory service provider 120, such as a Kerberos-based system, and the techniques described herein adapted accordingly. Directory service provider 120 is configured to manage user identity and credential information.

Data appliance 102 uses information stored by directory service provider 120 to enforce various policies. Such policies may apply to particular devices (e.g., device 104), particular users (e.g., "Alice Jones", denoted in directory service provider 120 as the object Alice.Jones), and/or groups (e.g., "laptop devices," "employees in the Marketing Department," and "director-level employees," each of which can also be represented in directory service provider 120 as an applicable object or set of objects). As one example, a policy may specify that device 104 is permitted to send print jobs to printer 128 while device 106 may not. As another example, a policy may specify that employees in the engineering department are permitted to access external site 126, while other employees are not.

Each morning when Alice arrives at ACME Corporation and logs into her computer 104, credential information is exchanged between client 104 and directory service provider 120. Data appliance 102 is made aware of the fact that Alice has successfully logged into device 104, and is able to apply appropriate policies to Alice's communications, whether they are rules pertaining specifically to device 104, to Alice (e.g., the Alice.Jones object stored by directory service provider 120), or to a group of which Alice's object is a member (e.g., the Marketing Department). Throughout the day, Alice's computer communicates with mail server 118—a Microsoft Exchange server in the example shown in FIG. 1—to send and retrieve email messages, calendar information, and other information, as applicable.

Bob also has identity/credential information maintained by directory service provider 120. For example, included in directory service provider 120 is an object for Bob.Smith. However, as neither of Bob's computers 106 and 108 run a Microsoft-based operating system, they do not exchange credential information with directory service provider 120 when Bob logs into them. As with Alice's computer 104 however, computer 106 periodically communicates with mail server 118 to retrieve email for Bob and to send any mail authored by Bob. Bob does not use computer 108 to access Microsoft Exchange server 118.

Included in network 122 is an 802.11 wireless access point (130). Alice has configured her personal tablet 110 to make use of the access point to communicate with external sites 126 and 132. Alice has also configured her personal tablet 110 to fetch email from Microsoft Exchange server 118. As with Bob's computers 106 and 108, Alice's tablet 110 does not communicate with directory service provider 120.

Microsoft Exchange server 118 is configured to keep, in log 134, event information such as the IP address, email address, and/or other credential information of ACME employees that access the Microsoft Exchange server to retrieve and send email. As will be described in more detail below, applicable portions of the contents of log 134 can be correlated with the contents of directory service provider 120. The results of the correlation are provided to data appliance 102 and allow it to enforce user policies against devices, such as devices 106-110, even though those devices do not directly communicate with directory service provider 120.

In some embodiments, log data 134 and data from directory service provider 120 are collected and correlated by an agent application 116, which is in communication with appliance 102. The agent can be implemented in a variety of ways, such as in a device that is separate from appliance 102 (as shown in FIG. 1) or as a module collocated on appliance 102, as applicable.

Figure 2A:
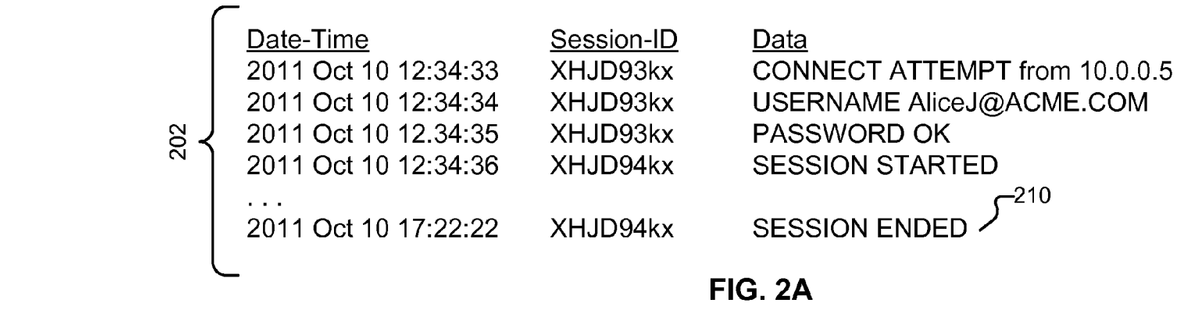
FIG. 2A illustrates a representation of log data obtained from a mail server.

FIG. 2A illustrates a representation of log data obtained from a mail server. The information shown is an abstraction of some of the types of information that can be extracted from log 134 of Microsoft Exchange server 118, in some embodiments. Other types of information may also be extracted from a log and correlated with the contents of directory service provider 120, as applicable. In the example shown, Alice's tablet computer 110, which has an IP address of 10.0.0.5, attempts to connect to server 118, provides Alice's corporate email address (AliceJ@ACME.COM), and provides Alice's correct password. A session is then successfully established between tablet 110 and server 118, allowing the tablet access to Alice's email and allowing tablet 110 the ability to send email on behalf of Alice.

The log data shown in FIG. 2A is retrieved by agent 116, which extracts pertinent information such as the date-time information, the IP address (10.0.0.5), and the email address (AliceJ@ACME.COM). Agent 116 correlates the extracted email address with information stored in directory service provider 120 to determine that the owner of the email address (AliceJ@ACME.COM) is the same individual as is represented in directory service provider 120, as object Alice.Jones. Agent 116 is thus able to determine that the user of tablet 110 (as of time 202) is Alice Jones. Agent 116 provides the information that it has learned to appliance 102 which can then enforce any applicable rules against tablet 110, and in particular, can now enforce any applicable user, group, or other appropriate rules, instead of merely enforcing device rules. In various embodiments, timeout information is also supplied by agent 116. As one example, when an indicator 210 is received that the session between tablet 110 and Microsoft Exchange server 118 has ended, agent 116 can inform appliance 102 that the mapping is no longer valid (or will cease being valid within some period of time). As another example, the mapping information determined by agent 116 is periodically automatically refreshed, instead of or in addition to agent 116 awaiting indicators, such as indicator 210, to know that a session has ended and the mapping may no longer be valid.

Figure 2B:
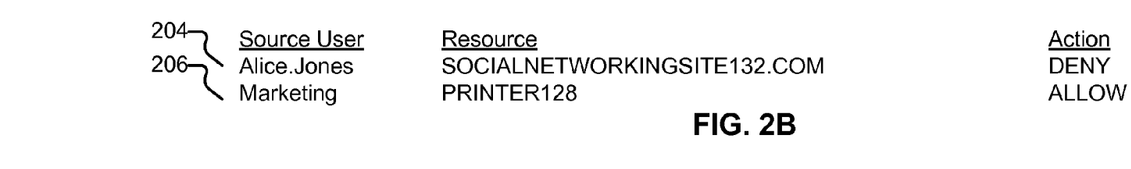
FIG. 2B illustrates an example of a set of policies.

FIG. 2B illustrates an example of a set of policies. Suppose ACME Corporation has a policy generally allowing its employees to access social networking sites from company computers, so long as the employees do not spend an excessive amount of time on such sites or post inappropriate things to such sites. Alice was recently determined to have violated the policy (e.g., by allowing her productivity to slip). To help Alice focus on her job, without penalizing other employees such as Bob, a rule was included in data appliance 102 that prohibits Alice from accessing site 132, entirely. When Alice uses computer 104, data appliance 102 is able to determine that it is Alice using her computer (instead of another user) because Alice logs into computer 104 with the assistance of directory service provider 120. Accordingly, if Alice attempts to access site 132 using computer 104, that access would be blocked by appliance 102. If Alice were to attempt to access site 132 with her tablet 110 while at work, without the techniques described herein being deployed, it is possible that she would succeed in reaching site 132 because appliance 102 would be unaware that the tablet is being used by Alice instead of by another ACME employee. However, because data appliance 102 is able to determine a mapping between tablet 110's IP address and Alice's object within directory service provider 120, Alice's attempted access of site 132 by tablet 110 can also be prevented by appliance 102.

Figure 3:
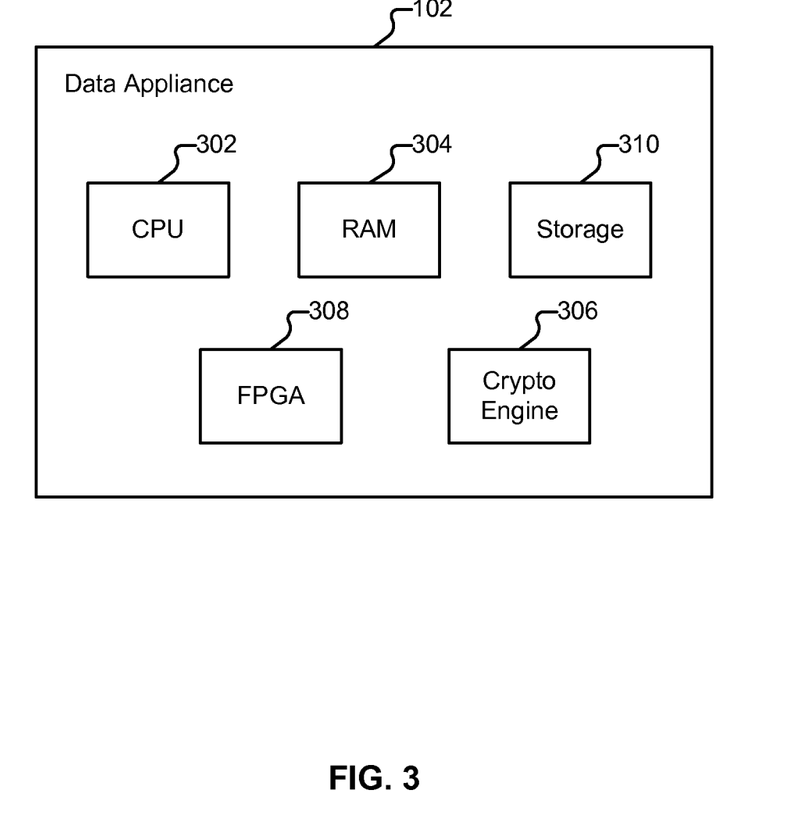
FIG. 3 illustrates an embodiment of a data appliance.

FIG. 3 illustrates an embodiment of a data appliance. The example shown is a representation of physical components that can be included in data appliance 102. Specifically, data appliance 102 includes a high performance multi-core CPU 302 and RAM 304. Data appliance 102 also includes a storage 310 (such as one or more hard disks), which is used to store policy and other configuration information. Data appliance 102 can also include one or more optional hardware accelerators. For example, data appliance 102 can include a cryptographic engine 306 configured to perform encryption and decryption operations, and one or more FPGAs 308 configured to perform signature matching, act as network processors, and/or perform other tasks.

Figure 4:
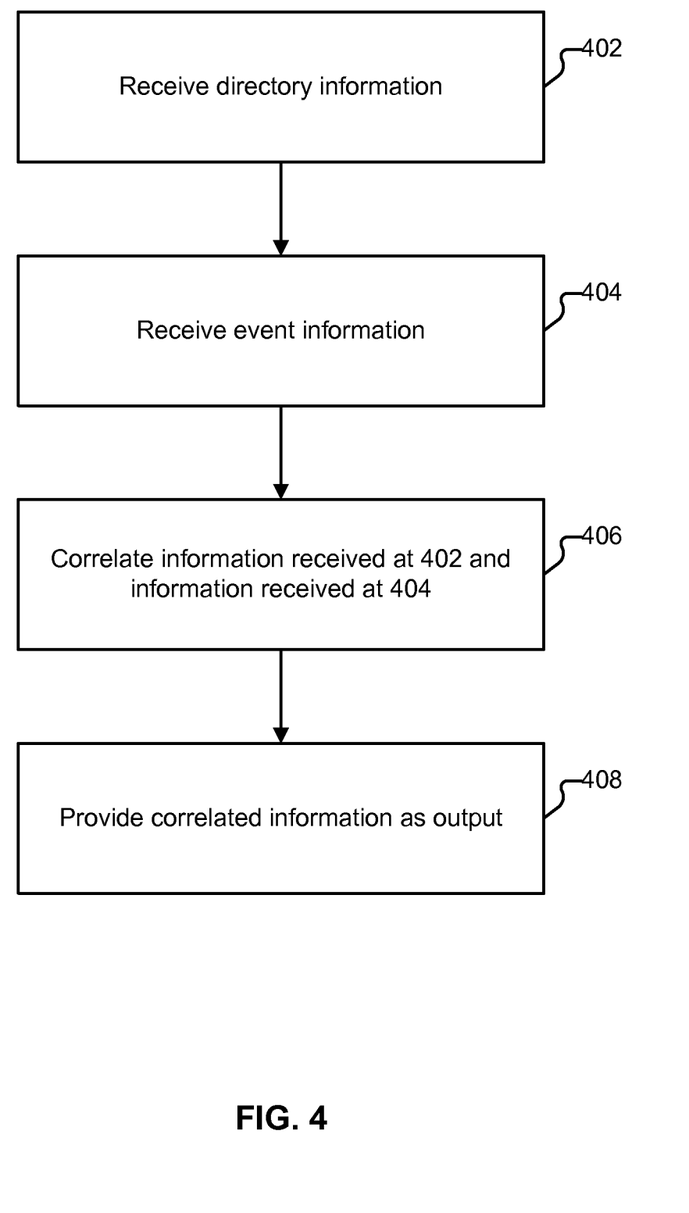
FIG. 4 illustrates an example of a process for identifying a user from an event.

FIG. 4 illustrates an example of a process for identifying a user from an event. In some embodiments, the process shown in FIG. 4 is performed by agent 116. In other embodiments, such as when the functionality of agent 116 is incorporated into appliance 102, the process shown in FIG. 4 is performed by appliance 102. The process begins at 402 when information is received from directory service provider 120. As one example, at 402, appliance 102 receives from directory service provider 120 the hierarchy of objects it stores (including the Alice.Jones object). At 404, event information is received, such as when Microsoft Exchange log 134 or portions thereof are received from Microsoft Exchange server 118. At 406, the received information is correlated. As one example, at 406, a determination is made that tablet 110 is being operated by Alice, based on the successful connection made by tablet 110 (having an IP address of 10.0.0.5) to Microsoft Exchange server 118, using Alice's credentials (AliceJ@ACME.COM and corresponding password). Finally, at 408, the correlated information (e.g., that 10.0.0.5 maps to Alice.Jones) is provided to appliance 102, so that it can enforce any applicable policies based on the correlated information and policies stored in storage 310 or loaded into RAM 304.

Additional elements can be included in the process shown in FIG. 4. One example is the receipt of initialization information (e.g., established during an initial connection between agent 116 and each of directory service provider 120 and server 118) which can be made prior to portion 402 of the process shown in FIG. 4.

Figure 5:
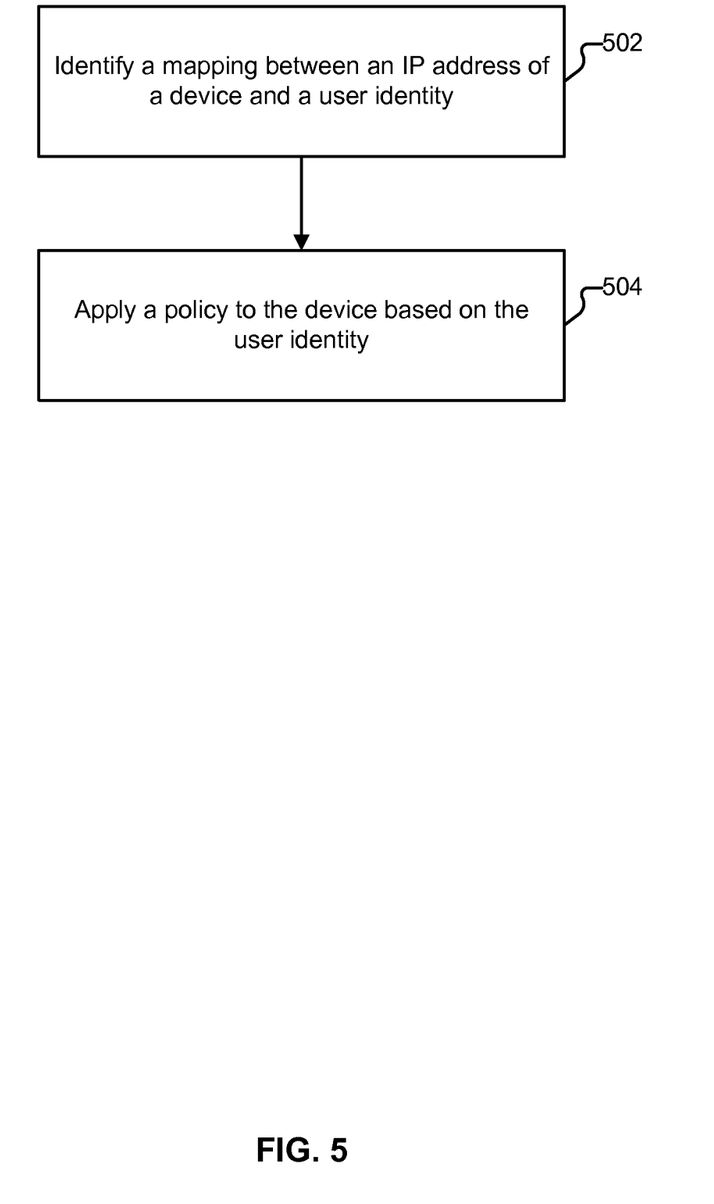
FIG. 5 illustrates an example of a process for enforcing a policy.

FIG. 5 illustrates an example of a process for enforcing a policy. In some embodiments, the process shown in FIG. 5 is performed by appliance 102. The process begins at 502 when a mapping between an IP address of a device and a user is determined. As one example, a mapping is determined when agent 116 determines that Alice is using tablet 110 and provides to appliance 102 the applicable IP address (tablet 110's IP address, 10.0.0.5) and directory service provider 120 user object (Alice.Jones). At 504, a policy is applied to the device based on the identified user identity. As one example, at 504, rule 204 of FIG. 2B would be applied to block an attempt by Alice (using either tablet 110 or computer 104) to access site 132. As another example, at 504, rule 206 of FIG. 2B would be applied to allow Alice to print to printer 128 from either computer 104 or tablet 110, because Alice is a member of the Marketing Department.

Figure 6:
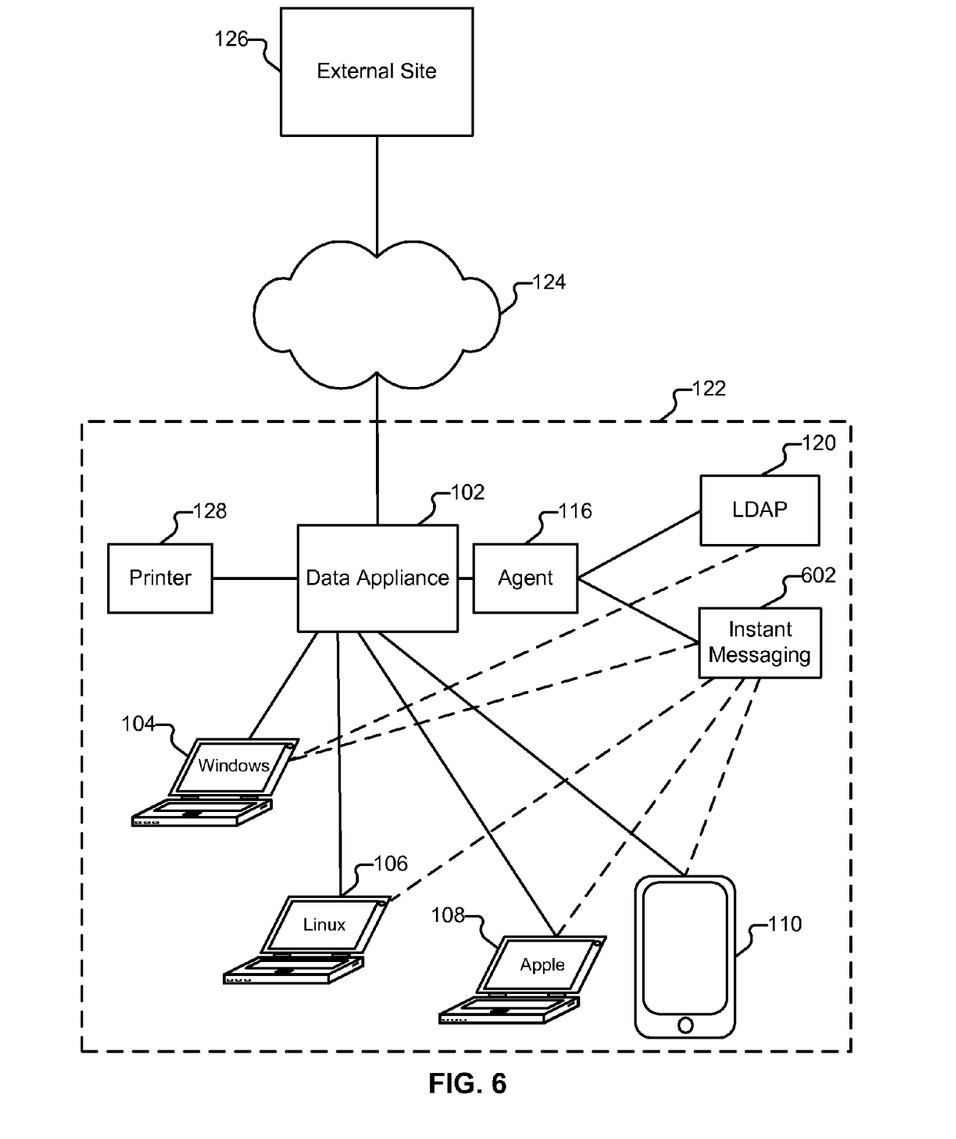
FIG. 6 illustrates an embodiment of an environment in which user identities are determined based on events (such as instant messaging events) and in which policies that incorporate the determined identities can be enforced.

FIG. 6 illustrates an embodiment of an environment in which user identities are determined based on events (such as instant messaging events) and in which policies that incorporate the determined identities can be enforced. As illustrated in the example shown in FIG. 6, user identity information can be obtained from sources other than mail servers and the techniques described herein adapted accordingly.

As one example, suppose device 108 is not used by Bob to check his corporate email (e.g., because he uses device 106 for that purpose). Bob does use computer 108 to access an enterprise instant messaging service (provided by instant messaging server 602) to communicate with other employees. Instant messaging server 602 requires its users to log in using credential information, such as a first and last name, or a corporate email address. Instant messaging server 602 also keeps event logs that include information, such as the date and time users access the instant messaging server, the credential information they supply, and whether or not access attempts are successful. In various embodiments, agent 116 is configured to retrieve the log information that is stored by instant messaging server 602 and correlate it with information stored by directory service provider 120.

Figure 2C:
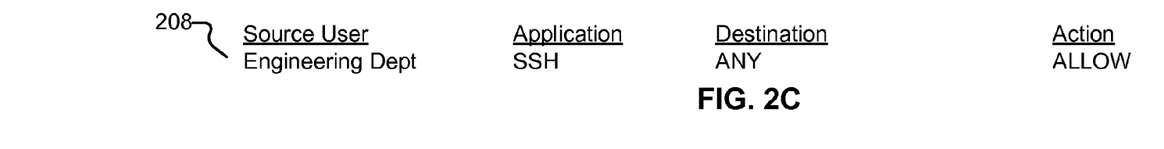
FIG. 2C illustrates an example of a policy.

The correlated information can be provided to data appliance 102 and used to enforce policies, such as policy 208, shown in FIG. 2C. Specifically, policy 208 allows any ACME employee who is also a member of the Engineering Department to access any destination, so long as the access occurs using the ssh protocol. When Bob uses computer 106, his identity would be usable by data appliance 102 to enforce policy 208, due to the processes shown in FIGS. 4 and 5 being applied with respect to computer 106. When Bob uses computer 108 to communicate with instant messaging server 602, Bob's computer will also be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might otherwise be required to use computer 106 for the same purpose).

Figure 2D:
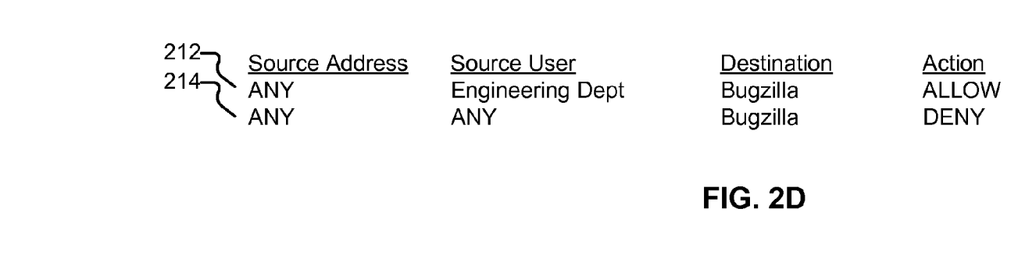
FIG. 2D illustrates an example of a set of policies.

Another set of policies that can be enforced is shown in FIG. 2D. Specifically, the rules permit members of the Engineering Department to access a bug tracking system (212), while denying access to the bug tracking system to everyone else (214). When Bob uses computer 106 to access his email (or 108 for instant messaging purposes), his identity would be usable by data appliance 102 to enforce policy 212 due to the processes shown in FIGS. 4 and 5 being applied with respect to computers 106 and/or 108, and without either of those computers needing to directly communicate with directory service provider 120.

Figure 7:
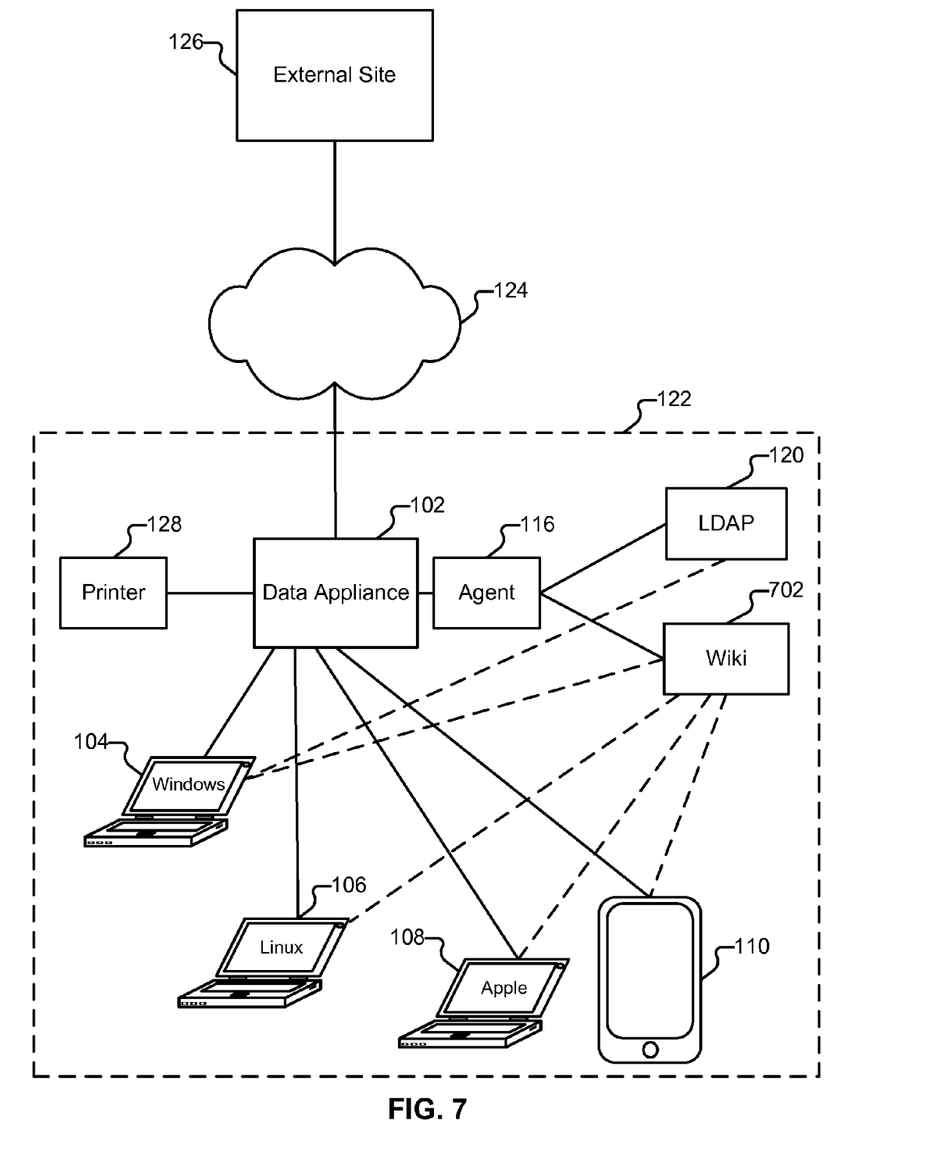
FIG. 7 illustrates an embodiment of an environment in which user identities are determined based on events (such as collaborative editing events) and in which policies that incorporate the determined identities can be enforced.

FIG. 7 illustrates an embodiment of an environment in which user identities are determined based on events (such as collaborative editing events) and in which policies that incorporate the determined identities can be enforced. As illustrated in the example shown in FIG. 7, user identity information can be obtained from sources other than mail servers and the techniques described herein adapted accordingly.

As one example, suppose device 108 is not used by Bob to check his corporate email (e.g., because he uses device 106 for that purpose). Bob does use computer 108 to access a collaborative website (an enterprise Wiki 702) to collaborate with other employees on documentation. Wiki 702 requires its users to log in using credential information, such as a first and last name, or a corporate email address. Wiki 702 also keeps event logs that include information, such as the date and time users access the Wiki, the credential information they supply, and whether or not access attempts are successful. In various embodiments, agent 116 is configured to retrieve the log information that is stored by Wiki 702 and correlate it with information stored by directory service provider 120. The correlated information can be provided to data appliance 102 and used to enforce policies, such as policy 208, shown in FIG. 2C. When Bob uses computer 108 to communicate with Wiki 702, Bob's computer will be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might not otherwise be required to use computer 106 for the same purpose).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive log data generated in response to a first user-provided device authenticating to an electronic mail server on a first network, wherein the generated log data includes at least a username portion of an email address of the user, wherein the first user-provided device is not authenticating to a directory service provider accessible via the first network, and wherein the first user-provided device has not authenticated to the directory service provider;
receive, from the first user-provided device, a request for a first resource that is external to the first network, wherein the first user-provided device has an IP address;
determine an identity of the user of the first user-provided device based at least in part on correlating at least a portion of the received log data, including the username portion of the email address, and identity information associated with the user and stored in the directory service provider;
determine a mapping between the IP address of the first device and the identity of the first user-provided device; and
apply a policy with respect to the request for the first resource based at least in part on the identity of the user of the first user-provided device; and
a memory coupled to the processor and configured to provide the processor with instructions.

2. The system of claim 1 wherein the identity information associated with the user comprises a user object maintained by the directory service provider.

3. The system of claim 1 wherein the processor is further configured to receive directory information.

4. The system of claim 3 wherein the processor is configured to receive the directory information from the directory service provider.

5. The system of claim 1 wherein the first device runs an operating system that is provided by a first entity and wherein the log data is received from a server running an operating system that is provided by a second entity that is different from the first entity.

6. The system of claim 1 wherein determining the identity of the user includes identifying a user object in the directory service provider without requiring the first device to log into the directory service provider.

7. The system of claim 1 wherein the user identity includes a username.

8. The system of claim 1 wherein the user identity includes a group.

9. The system of claim 1 wherein the processor is further configured to receive timeout information associated with the mapping.

10. A method, comprising:
receiving log data generated in response to a first user-provided device authenticating to an electronic mail server on a first network, wherein the generated log data includes at least a username portion of an email address of the user, wherein the first user-provided device is not authenticating to a directory service provider accessible via the first network, and wherein the first user-provided device has not authenticated to the directory service provider;
receiving, from the first user-provided device, a request for a first resource that is external to the first network, wherein the first user-provided device has an IP address;
determining an identity of the user of the first user-provided device based at least in part on correlating at least a portion of the received log data, including the username portion of the email address, and identity information associated with the user and stored in the directory service provider;
determining a mapping between the IP address of the first device and the identity of the first user-provided device; and
applying a policy with respect to the request for the first resource based at least in part on the identity of the user of the first user-provided device.

11. The method of claim 10 further comprising receiving directory information from the directory service provider.

12. The method of claim 10 wherein the identity information associated with the user comprises a user object maintained by the directory service provider and wherein determining the identity of the user includes identifying the user object in the directory service provider without requiring the first device to log into the directory service provider.

13. A computer program product embodied in a non-transitory computer readable storage medium and comprising computer instructions for:
receiving log data generated in response to a first user-provided device authenticating to an electronic mail server on a first network, wherein the generated log data includes at least a username portion of an email address of the user, wherein the first user-provided device is not authenticating to a directory service provider accessible via the first network, and wherein the first user-provided device has not authenticated to the directory service provider;
receiving, from the first user-provided device, a request for a first resource that is external to the first network, wherein the first user-provided device has an IP address;
determining an identity of the user of the first user-provided device based at least in part on correlating at least a portion of the received log data, including the username portion of the email address, and identity information associated with the user and stored in the directory service provider;
determining a mapping between the IP address of the first device and the identity of the first user-provided device; and
applying a policy with respect to the request for the first resource based at least in part on the identity of the user of the first user-provided device.

14. The method of claim 10 wherein the identity information associated with the user comprises a user object maintained by the directory service provider.

15. The method of claim 10 wherein the first device runs an operating system that is provided by a first entity and wherein the log data is received from a server running an operating system that is provided by a second entity that is different from the first entity.

16. The method of claim 10 wherein determining the identity of the user includes identifying a user object in the directory service provider without requiring the first device to log into the directory service provider.

17. The method of claim 10 wherein the user identity includes a username.

18. The method of claim 10 wherein the user identity includes a group.

19. The method of claim 10 further comprising receiving timeout information associated with the mapping.

20. The computer program product of claim 13 further comprising computer instructions for receiving timeout information associated with the mapping.

* * * * *